(No Model.)
A. WATKINS.
INSTRUMENT FOR CALCULATING PHOTOGRAPHIC EXPOSURES.
No. 456,869. Patented July 28, 1891.
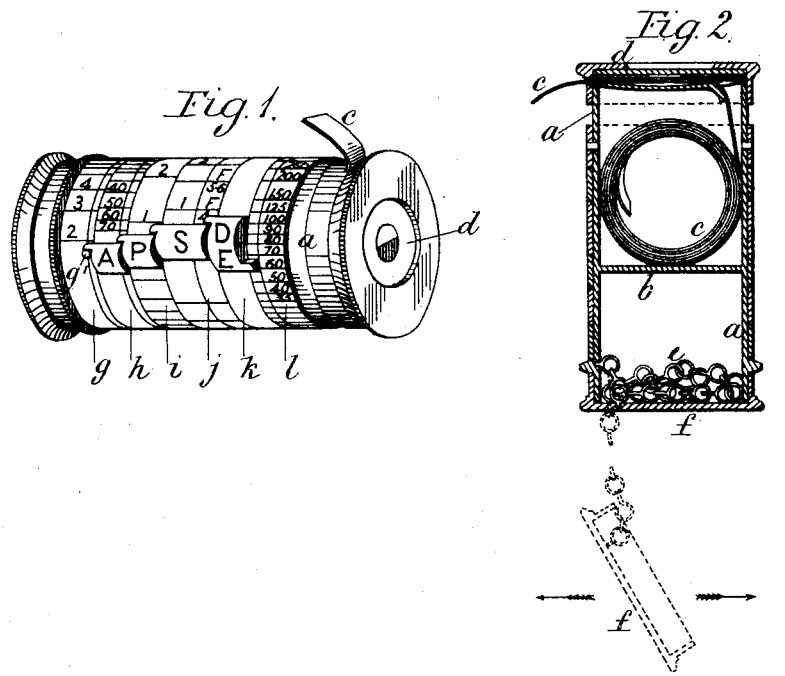
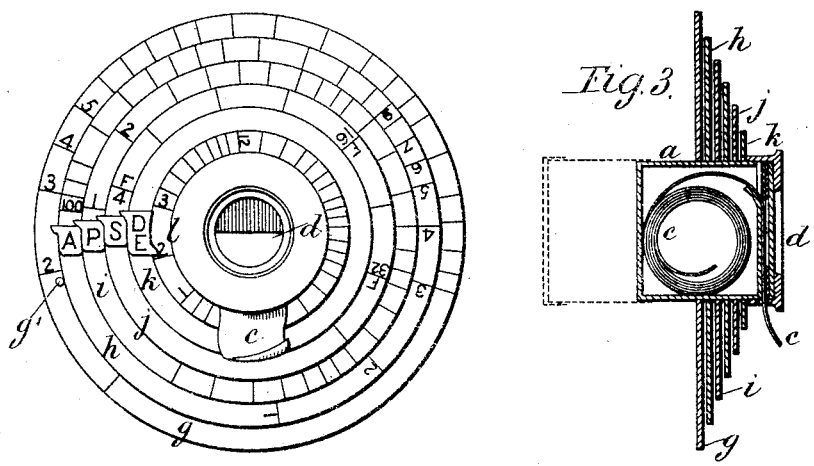
Witnesses:
J. A. Rutherford
J. G. Meyers Jr.
Inventor:
Alfred Watkins
By James L. Norris
Attorney

UNITED STATES PATENT OFFICE.

ALFRED WATKINS, OF HEREFORD, ENGLAND.

INSTRUMENT FOR CALCULATING PHOTOGRAPHIC EXPOSURES.

SPECIFICATION forming part of Letters Patent No. 456,869, dated July 28, 1891.

Application filed November 20, 1890. Serial No. 372,022. (No model.) Patented in England January 27, 1890, No. 1,388.

*To all whom it may concern:*

Be it known that I, ALFRED WATKINS, miller, a citizen of England, residing at the Imperial Flour Mills, Hereford, in the county of Hereford, England, have invented a new and useful Instrument for Calculating Photographic Exposures, (for which I have made application for Patent in Great Britain, which patent when granted will bear date January 27, 1890, No. 1,388,) of which the following is a specification.

The exposure required for a photographic plate is dependent upon four conditions—namely, A, the actinic force of the light; P, the sensitiveness of the plate; S, the color or character of the object to be photographed and its distance from the lens, and D the relation of the diaphragm of the lens to its focal length. All these conditions, except A, are usually known to the photographer, and A can be readily ascertained by observing in an actinometer how long the light takes to darken a piece of sensitive bromide paper (treated with potassium nitrite) to a standard tint, in a manner well known to photographers.

My invention relates to an instrument in which are combined an actinometer and a set of movable calculating scales for ascertaining the exposure, with which is by preference also combined a pendulum for timing both the actinometer and the duration of exposure.

The construction of the said instrument which I prefer to employ is of tubular form, the scales being in the form of movable rings on the outer surface of the tube, which is internally divided into two compartments, one of which contains the sensitive paper for the actinometer, which is situated at the one end of the tube, while the other compartment is made to contain the pendulum, which is preferably made of a light metal chain about ten inches in length, so as to swing in half-seconds, the lid of the box being conveniently made to form the bob of the pendulum.

Figure 1 of the accompanying drawings shows a perspective view of the form of the instrument which I prefer to employ, and Fig. 2 shows a longitudinal section of the same. Figs. 3 and 4 show, respectively, a section and elevation of a modified construction.

$a$ is a metal tube divided internally by a partition $b$ into two compartments, one of which contains the roll of sensitive paper $c$ of the actinometer $d$, which forms a cap to one end of the tube. The other compartment contains a metal chain $e$, attached at one end to the tube $a$ or to the partition $b$ and at the other end to the cover $f$, closing the other end of the tube, which cover when removed, as shown in dotted lines, forms the bob of the pendulum. For calculating the time of exposure there are provided on the outer surface of the tube $a$ six rings $g\ h\ i\ j\ k\ l$, of which the two outer ones $g\ l$ are fixed to the tube, while the other four can be rotated upon it. The ring $g$ is marked with a scale for A, before mentioned, the ring $h$ has the scale for P, the ring $i$ the scale for S, the ring $j$ the scale for D, while the ring $l$ is marked with a scale of seconds, indicating the time of exposure or the result of the calculation. The rings $h\ i\ j\ k$ have each a projecting stud marked, respectively, A P S and D E and having a pointer projecting over the preceding scale, so that the pointer A of ring $h$ indicates the divisions on the scale for A of ring $g$, and so on, while the second pointer E on the ring $k$ (which has no scale) indicates the division on the scale of $l$. On the ring $g$ is a stop-pin $g'$, against which the pointer A bears when it is opposite the commencement of scale A, so that the ring $h$ cannot be turned back below the first division. In like manner the pointers P, S, and D, in projecting over the studs of the preceding rings, prevent their respective rings from being turned backward beyond the point of contact with the stud, while if the ring $h$ is advanced on the scale A it will at the same time cause all the other scales to advance with it, and thus it will be seen that each successive scale can only be moved into a position in advance of that given to the preceding one, so that the scale constitutes a mutually-dependent series.

The several scales are divided in logarithmic proportion in a similar way to those of an ordinary slide-rule, the complete circle of each scale being divided into one thousand parts. They are marked in accordance with tables well known to photographers, and consequently require no further description.

It will be evident that instead of making the rings cylindrical, as shown, they may be of disk form of varying diameters, as shown in section and elevation at Figs. 3 and 4, where the rings or disks $g$ and $l$ are fixed to the tube $a$, as before, while $h\ i\ j\ k$ are rotatable. These disks are marked with scales and are provided with the pointers A P S D E in precisely the same manner as in the first-described arrangement.

$d$ is the actinometer with sensitive paper $c$.

The box containing the pendulum may either be separate or it may be added, as indicated by dotted lines, Fig. 3, or the actinometer may be a separate instrument and the tube $a$ constitute the box for the pendulum. I prefer, however, to combine all three parts in the form indicated by Figs. 1 and 2 as being the most compact and useful.

The method of using the instrument is as follows: Hold the face of the actinometer toward the light as it falls upon the subject to be photographed and then allow the pendulum to swing, draw out a bit of the sensitive paper, and note how many seconds it takes to darken to the standard tint. This number is the actinometer number. Set pointer A to this number, pointer P to the number representing the sensitiveness of the plate, pointer S to 100, if the objects to be photographed are of average color, higher (up to 300) if they are darker than average, and lower (down to 25 for white objects) if they are lighter than average. Pointer D is now set to the optical number of the stop used in the lens, and the remaining pointer E indicates the number of seconds or decimal fractions of a second to expose.

Example: An average landscape in good light taking five seconds to darken the actinometer, using a Cramer B plate, with a stop of F/22, the calculation would be A5, P15, S100, D, F/22, exposure three seconds.

Having thus described the nature of my invention and the best means I know of carrying the same into practical effect, I claim—

1. An instrument for calculating photographic exposures, consisting of the combination of a set of movable circular slide-rules, an actinometer, and a pendulum, substantially as described.

2. In an instrument for calculating photographic exposures, the combination, with a tubular receptacle, of a set of scales mounted thereon, consisting, first, of a fixed circular scale indicating the actinic force of light; secondly, a rotatable scale indicating the sensitiveness of the plate; thirdly, a rotatable scale indicating the color or character of the object to be photographed and its distance from the lens; fourthly, a rotatable scale indicating the relation of the diaphragm of the lens to its focal length, and, fifthly, a fixed scale indicating the duration of exposure in seconds, said movable scales being made with pointers projecting over the preceding scale, so that the pointer of one scale acts as stop to the next one, substantially as and for the purposes set forth.

In testimony whereof I have signed my name to this specification, in the presence of two subscribing witnesses, this 3d day of November, A. D. 1890.

ALFRED WATKINS.

Witnesses:
 JOSEPH THOMAS,
  41 *Eign St., Hereford, Accountant.*
 O. L. BRADLEY,
  39 *Mill St., Hereford, Solicitor's Clerk.*